United States Patent
Van Lunteren et al.

(10) Patent No.: US 12,462,201 B2
(45) Date of Patent: Nov. 4, 2025

(54) DYNAMICALLY OPTIMIZING DECISION TREE INFERENCES

(71) Applicant: INTERNATIONAL BUSINESS MACHINES CORPORATION, Armonk, NY (US)

(72) Inventors: Jan Van Lunteren, Rüschlikon (CH); Nikolaos Papandreou, Thalwil (CH); Charalampos Pozidis, Thalwil (CH); Martin Petermann, Zürich (CH); Thomas Parnell, Zürich (CH); Milos Stanisavljevic, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 17/658,841

(22) Filed: Apr. 12, 2022

(65) Prior Publication Data

US 2023/0325681 A1 Oct. 12, 2023

(51) Int. Cl.
*G06N 20/20* (2019.01)
*G06N 5/01* (2023.01)

(52) U.S. Cl.
CPC .............. *G06N 20/20* (2019.01); *G06N 5/01* (2023.01)

(58) Field of Classification Search
CPC ................................ G06N 5/01; G06N 20/20
See application file for complete search history.

(56) References Cited

U.S. PATENT DOCUMENTS

| | | | |
|---|---|---|---|
| 10,572,823 B1 * | 2/2020 | Feinman | G06F 21/56 |
| 11,901,080 B1 * | 2/2024 | Matt | G06T 7/0012 |
| 2004/0267785 A1 | 12/2004 | Suontausta et al. | |
| 2011/0295777 A1 | 12/2011 | Jang et al. | |
| 2015/0379426 A1 | 12/2015 | Steele | |
| 2018/0189667 A1 * | 7/2018 | Tsou | G06N 5/01 |

(Continued)

FOREIGN PATENT DOCUMENTS

| | | | | |
|---|---|---|---|---|
| TW | 201145186 A | | 12/2011 | |
| WO | WO-2020190796 A1 * | | 9/2020 | G06F 12/0891 |

OTHER PUBLICATIONS

NPL Asadi Runtime Optimizations for Tree based ML Models 2014.*

(Continued)

*Primary Examiner* — Paul M Knight
(74) *Attorney, Agent, or Firm* — Andre L. Adkins

(57) ABSTRACT

A method of dynamically optimizing decision tree inference is provided. The method, which is performed at the computerized system, repeatedly executes one or more decision trees for inference purposes and repeatedly performs an optimization procedure according to two-phase cycles. Each cycle includes two alternating phases, i.e., a first phase followed by a second phase. The decision trees are executed based on a reference data structure, whereby attributes of nodes of the decision trees are repeatedly accessed from the reference data structure during the first phase of each of the cycles. First, the accessed attributes are monitored during the first phase of each cycle, which leads to update statistical characteristics of the nodes. Second, a substitute data structure is configured during the second phase of each cycle based on the updated statistical characteristics. Third, the reference data structure is updated in accordance with the substitute data structure.

25 Claims, 7 Drawing Sheets

(56) References Cited

U.S. PATENT DOCUMENTS

| | | | | |
|---|---|---|---|---|
| 2018/0324193 | A1* | 11/2018 | Ronen | G06N 20/00 |
| 2018/0336487 | A1 | 11/2018 | Moore | |
| 2019/0138942 | A1* | 5/2019 | Raskovalov | G06N 5/01 |
| 2019/0378210 | A1* | 12/2019 | Merrill | G06N 5/01 |
| 2020/0192307 | A1* | 6/2020 | Wee | G06N 20/00 |
| 2020/0293456 | A1 | 9/2020 | Ramadoss et al. | |
| 2020/0387811 | A1* | 12/2020 | Cohen | G06N 5/04 |
| 2021/0365832 | A1* | 11/2021 | Hu | G06N 20/20 |
| 2022/0012550 | A1* | 1/2022 | Ben-Itzhak | G06F 18/2185 |
| 2022/0284306 | A1* | 9/2022 | Osogami | G06N 7/01 |

OTHER PUBLICATIONS

NPL Chen XGBoost a Scalable Tree Boosting System 2016.*
NPL Kalusivalingam Leveraging Random Forests and Gradient Boosting 2022.*
NPL Lalchand meta algorithm using random recursive tree ensembles 2020.*
NPL Lunteren Inventor Accelerating Decision Tree based Inference 2023.*
NPL Madhyastha PACSET Packed Serialized Trees 2020.*
NPL Tariverdiyev Machine Learning Algorithms 2019.*
NPL Vijayakumar Multistage Ensembled Classifer Sep. 2021.*
NPL Xie Tahoe 2021.*
Asadi, et al., "Runtime Optimizations for Prediction with Tree-Based Models", https://ieeexplore.ieee.org/document/6513227, IEEE Transactions on Knowledge and Data Engineering, vol. 26, No. 9, Sep. 2014, pp. 2281-2292.
Madhyastha, et al., "PACSET (Packed Serialized Trees): Reducing Inference Latency for Tree Ensemble Deployment", https://arxiv.org/abs/2011.05383, arXiv:2011.05383v1 [cs.DC], Nov. 10, 2020, 13 pgs.
Xie, et al., "Tahoe: Tree Structure-Aware High Performance Inference Engine for Decision Tree Ensemble on GPU", https://dl.acm.org/doi/abs/10.1145/3447786.3456251, EuroSys '21, Apr. 26-29, 2021, Online, United Kingdom, 15 pgs.

* cited by examiner

| SN0 | SN1 | SN4 | SN9 | LN4 | SN... |
|---|---|---|---|---|---|
| Access count | Access count | Access count | Access count | Access count | ... |
| Node attributes | Node attributes | Node attributes | Node attributes | Node attributes | ... |

400

| SN0 | ... | SN2 | SN5 | SN12 | LN11 | SN... |
|---|---|---|---|---|---|---|
| Access count | ... | Access count | Access count | Access count | Access count | ... |
| Node attributes | ... | Node attributes | Node attributes | Node attributes | Node attributes | ... |

DYNAMICALLY OPTIMIZING DECISION TREE INFERENCES

BACKGROUND

The invention relates in general to the field of methods, computerized systems, and computer program products for dynamically optimizing decision tree inference operations. In particular, it is directed to computerized methods wherein decision trees are repeatedly executed during active periods, during which the accessed nodes are monitored. The data structures used to execute the decision trees are reconfigured during idle periods alternating with the active periods, based on statistical characteristics obtained by monitoring the accessed nodes. Decision tree learning is a predictive modelling approach used in machine learning. It relies on one or more decision trees, forming the predictive model. Decision trees are widely used machine learning algorithms, owing to their simplicity and interpretability. Different types of decision trees are known, including classification trees and regression trees. A binary decision tree is basically a structure involving coupled decision processes. Starting from the root, a feature is evaluated, and one of the two branches of the root node is selected. This procedure is repeated until a leaf node is reached, a value of which is used to assemble a final result.

Random forest and gradient boosting are important machine learning methods, which are based on binary decision trees. In such methods, multiple decision trees are "walked" in parallel until leaf nodes are reached. The results taken from the leaf nodes are then averaged (regression) or used in a majority vote (classification). Such computations can be time and resource consuming, hence a need to accelerating tree-based inference, notably for ensemble models such as random forest and gradient boosting methods.

Several approaches have been proposed to accelerate tree-based inferences, by optimizing hardware and/or algorithmic characteristics. For example, access characteristics to individual nodes of a decision tree can be exploited to optimize the organization of the decision tree in memory, in order to improve performance (i.e., reduce prediction latency and increase throughput). Such access characteristics can be collected offline and/or online. The online approach is notably used when the properties of input data fluctuate over time. However, collecting access characteristics online usually has an impact on the performance of the inferences.

SUMMARY

Various embodiments provide a method and system for dynamically optimizing decision tree inference operations as described by the subject matter of the independent claims. Advantageous embodiments are described in the dependent claims. Embodiments of the present invention can be freely combined with each other if they are not mutually exclusive.

According to a first aspect, the present invention is embodied as a method of dynamically optimizing decision tree inference operations performed by a computerized system. The method, which is performed at the computerized system, repeatedly executes one or more decision trees for inference purposes and repeatedly performs an optimization procedure according to two-phase cycles. That is, each cycle includes two alternating phases, i.e., a first phase followed by a second phase. The decision trees are executed based on a reference data structure, whereby attributes of nodes of the decision trees are repeatedly accessed from the reference data structure during the first phase of each of the cycles. The optimization procedure comprises three steps. First, the accessed attributes are monitored during the first phase of each cycle, which leads to update statistical characteristics of the nodes. Second, a substitute data structure is configured during the second phase of each cycle based on the updated statistical characteristics. Third, the reference data structure is updated in accordance with the substitute data structure. The reference data structure can for instance by updated during the second phase of at least some of the cycles. However, substitution mechanisms are disclosed, which allow the reference data structure to be updated at any time, if necessary.

The proposed method intermittently monitors access characteristics during the first phases of the cycles, i.e., time periods during which the system execute the trees for inference purposes. Besides, the method reconfigures the underlying tree representation during the subsequent time periods. This makes it possible to repeatedly improve the memory representation of the decision trees (i.e., the data structure used to execute the trees at runtime). The optimization is a dynamic process, which can take into account the most recent access characteristics observed, so as to optimize the underlying tree representation against a continually changing context. Notwithstanding, the optimization is performed as an auxiliary process, so as to minimize the impact on the primary process, i.e., the inference process.

In embodiments, the first phase of each cycle is triggered upon receiving a request to perform inferences, while the second phase is subsequently triggered upon completing said inferences. Then, the first phase of the next cycle is triggered upon receiving a further request to perform further inferences. In variants, the cycles aim at processing respective input datasets, or respective sets of input datasets, through the one or more decision trees for inference purposes, so as to gradually optimize the reference data structure from one (set of) input dataset(s) to the other.

The reference data structure is preferably updated during the second phase of at least some of the cycles.

In embodiments, the reference data structure is simply updated by substituting at least a subset of the reference data structure for the substitute data structure, e.g., in a memory buffer of the computerized system, from which the attributes are repeatedly accessed upon executing the decision trees.

In preferred embodiments, the reference data structure is stored in a memory buffer of the computerized system, whereby the attributes are repeatedly accessed from this memory buffer upon executing the one or more decision trees. In addition, the reference data structure is updated by substituting at least said subset of the reference data structure for the substitute data structure in the memory buffer.

Preferably, the substitute data structure represents only a subset of the one or more decision trees, whereby only said subset of the reference data structure is substituted for the substitute data structure in the memory buffer, while a residual subset of the reference data structure is modified to logically link it to the substitute data structure. Note, the substitute data structure is preferably substituted in steps. For example, the substitute data structure may first be written in the memory buffer, in addition to a corresponding subset of the reference data structure. Next, the substitute data structure is linked into the data structure by overwriting a transition from a relevant node in the reference data structure to the substitute data structure. Finally, the original subset of the reference data structure can be deleted from the memory buffer The updated statistical characteristics may notably include at least a most likely path of access to the nodes. In that case, configuring the substitute data structure may comprise writing attributes of the identified nodes in blocks of the substitute data structure, wherein the blocks are ordered in accordance with said statistical order. The reference data structure is updated by writing the ordered blocks to memory blocks of the memory buffer, whereby attributes of at least some pairs of the nodes that are consecutively accessed as per said statistical order are written in consecutive memory blocks of the memory buffer, to leverage locality of the data.

According to another aspect, the invention is embodied as a computer program product for dynamically optimizing decision tree inference operations. The computer program product comprises a computer readable storage medium having program instructions embodied therewith. The program instructions are executable by processing means to cause the latter to perform steps as described above, i.e., repeatedly executing one or more decision trees for inference purposes and repeatedly performs an optimization procedure according to two-phase cycles, consistently with the present methods.

According to a final aspect, the invention is embodied as a computerized system for dynamically optimizing decision tree inference operations. The computerized system comprises processing means that are configured to repeatedly execute one or more decision trees for inference purposes and repeatedly perform an optimization procedure according to two-phase cycles, as described above in reference to methods according to embodiments.

In particular, the program instructions may be executable by the processing means to further cause the latter to update the reference data structure by substituting at least a subset of the reference data structure for the substitute data structure.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings:

FIG. 4 schematically illustrates how this optimization procedure writes attributes of nodes corresponding to the access paths shown in FIG. 3 in consecutive blocks of a substitute data structure, with a view to updating a reference data structure used to execute the nodes, as involved in embodiments;

The accompanying drawings show simplified representations of devices or parts thereof, as involved in embodiments. Similar or functionally similar elements in the figures have been allocated the same numeral references, unless otherwise indicated.

Computerized systems, methods, and computer program products embodying the present invention will now be described, by way of non-limiting examples.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The following description is structured as follows. General embodiments and high-level variants are described in section 1. Section 2 addresses particularly preferred embodiments. Section 3 concerns technical implementation details. The present method and its variants are collectively referred to as the "present methods". All references Sn refer to methods steps of the flowcharts of FIG. 6, while numeral references pertain to devices, components, and concepts involved in embodiments of the present invention.

Figure 7:
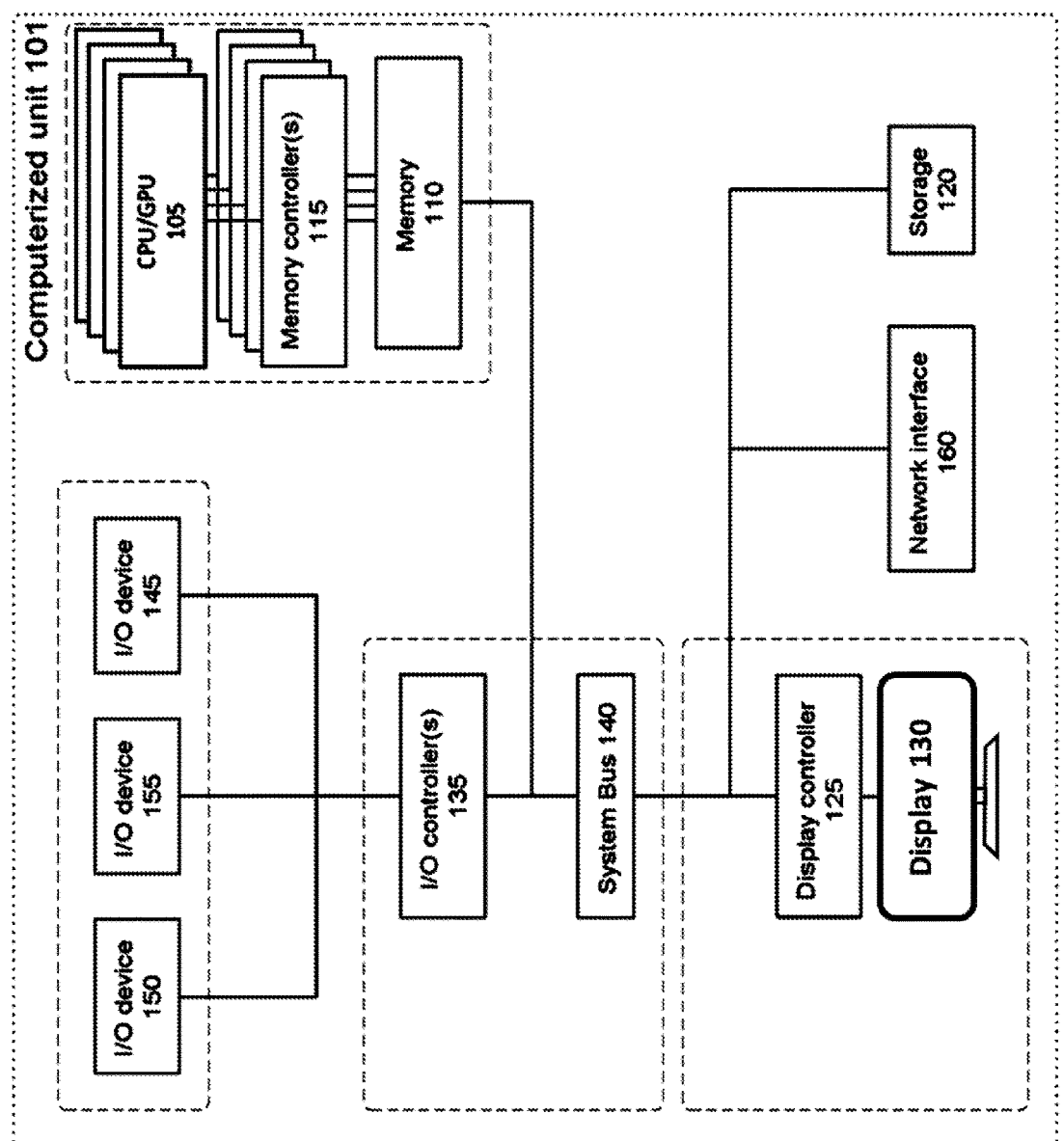
FIG. 7 schematically represents a general-purpose computerized system, suited for implementing one or more method steps as involved in embodiments of the invention.

In reference to FIG. 7, a first aspect of the invention is now described, which concerns a method of dynamically optimizing decision tree inference operations performed by a computerized system. This system, which concerns another aspect of the invention, may include one or more computerized units 101 such as shown in FIG. 7. The key steps of the method are performed at the computerized system.

Figure 1:
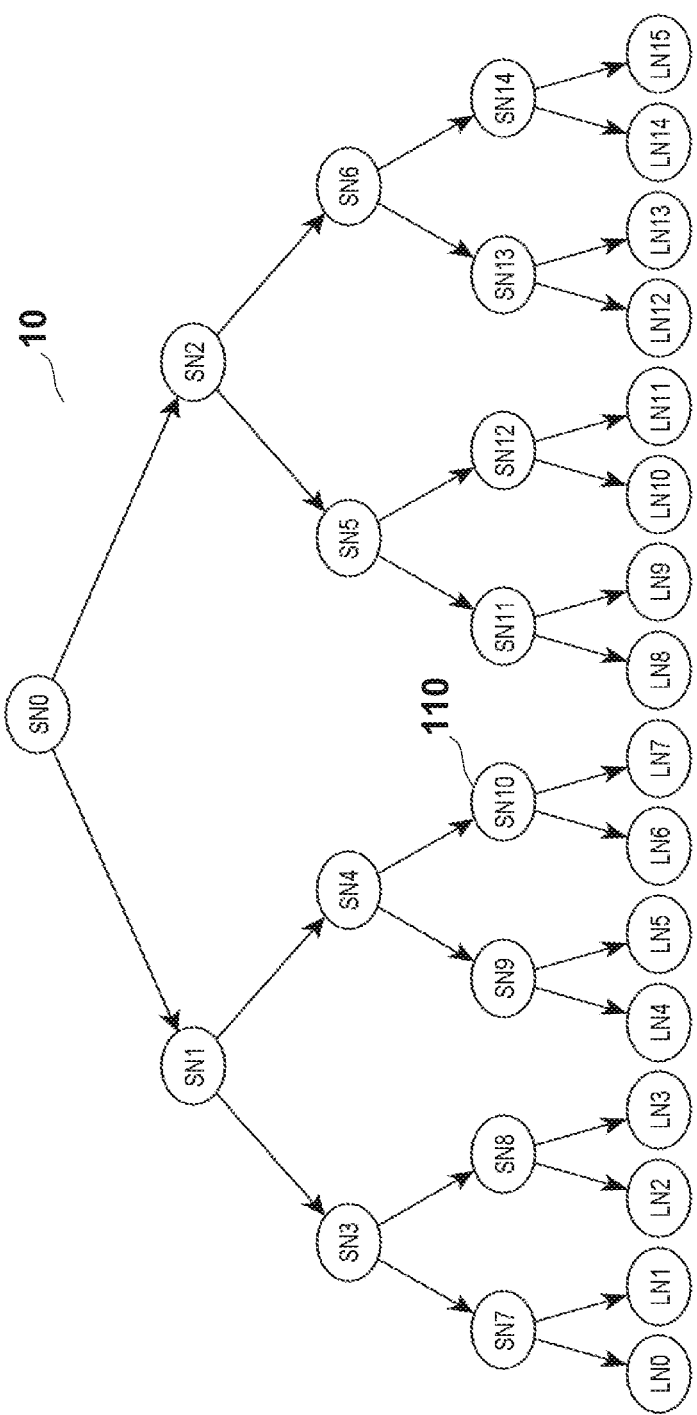
FIG. 1 depicts a decision tree as involved in embodiments. The tree includes split nodes and leaf nodes. Embodiments of the present invention may involve a number of such trees, which can typically be much larger in practice.

The aim of this method is to optimize machine learning inferences with decision trees 10 such as shown in FIG. 1. Each tree 10 comprises nodes 110, 120, which include split nodes 110 and leaf nodes 120. In this example, the split nodes are denoted by references SN0 (corresponding to the root node) to SN14, while the leaf nodes are denoted by references LN0 to LN15. Each split node includes at least two child nodes. In practice, the decision trees may typically all be binary trees, in which case each split node gives rise to exactly two child nodes, as in FIG. 1. Such a decision tree is executed as follows: starting from the root, a feature is evaluated, and one of the two branches of the root node is selected. This procedure is repeated until a leaf node is reached, a value of which is used to form a final result.

Figure 2:
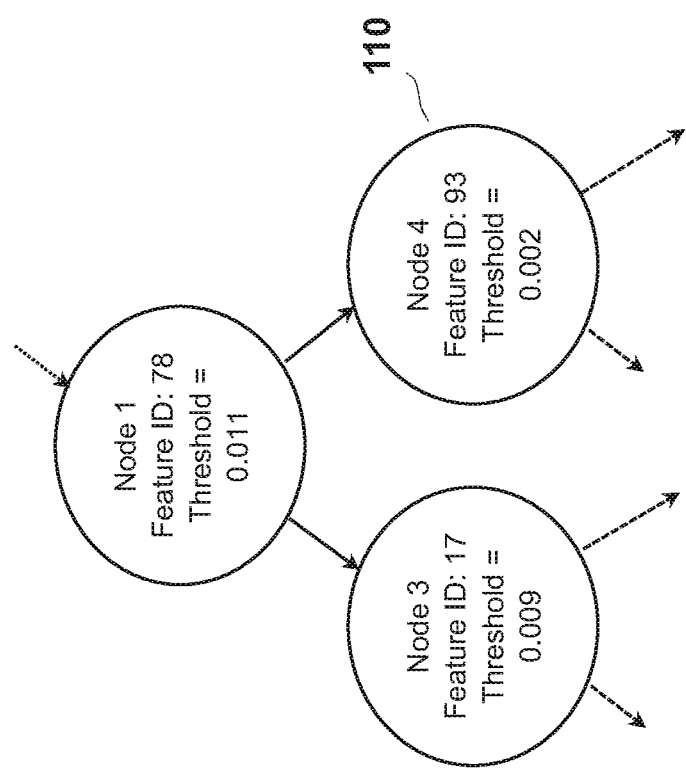
FIG. 2 shows a selection of connected nodes of a decision tree such as shown in FIG. 1, together with attributes of the nodes. In operation, such attributes are processed to execute the nodes, as involved in embodiments.

To that aim, use is made of attributes of the nodes; such attributes include operands that are required to execute the nodes. These attributes may for instance include feature identifiers (also called feature selectors), thresholds used for comparisons, and, more generally, all arguments needed for evaluating the rules captured by the decision tree nodes. Each split node of a decision tree is labelled with a feature identifier and is associated with a threshold to perform an operation. E.g., a feature value corresponding to a feature identifier is compared to a threshold, as known per se. This is illustrated in FIG. 2, which depicts selected split nodes 110 of a tree, together with respective feature identifier values ("feature ID") and threshold values.

As usual with prior tree-based inference methods, the present methods need to access input records (i.e., test data or inference data), which are fed to the decision trees for execution of the latter, with a view to forming an inference result, e.g., a classification or a regression. The decision trees are assumed to have already been trained based on training data; the training of the trees is orthogonal to the present invention. Running the decision trees causes to form an inference result for each tree, based on an outcome of executing the nodes 110, 120 of this tree. In the present case, several decision trees may be executed, which may form part of an ensemble model such as a random forest or a gradient boosting model. Thus, a global result may eventually be constructed based on inference results obtained from each decision tree, e.g., for classification or regression purposes.

The proposed method basically amounts to repeatedly executing S62 one or more decision trees 10 for inference purposes and repeatedly performing S70 an optimization procedure, where the optimization procedure is partly interlaced with the execution of the decision trees. This method can be applied to a single decision tree. In that case, both the inferences and optimizations performed concern a single decision tree. However, this method may also apply to a set of decision trees and, thus, to ensemble techniques. Yet, the optimizations performed may not necessarily apply to all of the decision trees. In addition, the optimizations performed may only concern a subset of any decision tree involved, as in embodiments discussed later in detail.

Figure 6:
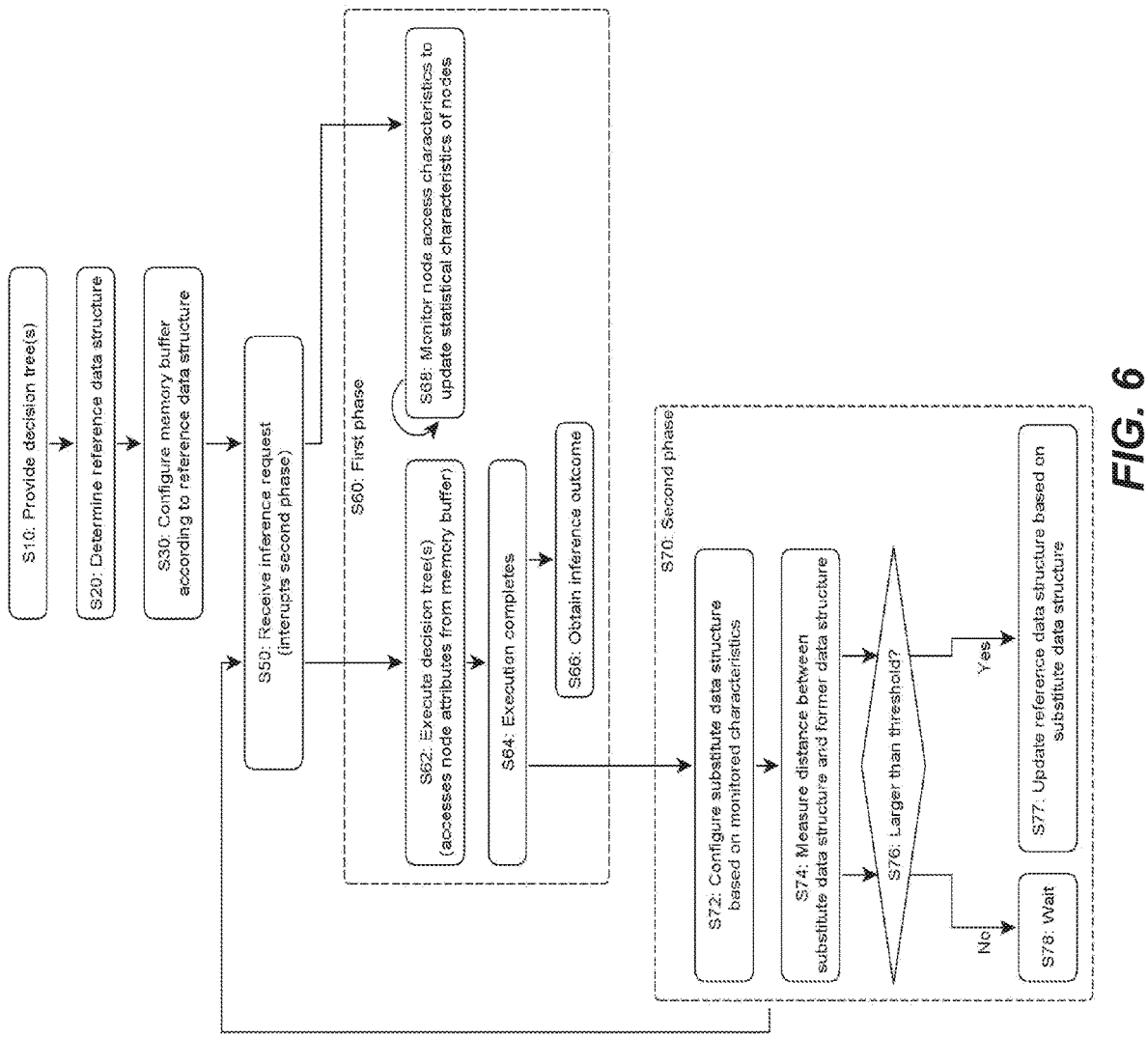
FIG. 6 is a flowchart illustrating high-level steps of a method of dynamically optimizing decision tree inference operations, according to embodiments.

The method relies on two-phase cycles, where each cycle involves two alternating phases, corresponding to general steps S60 and S70 in the flowchart of FIG. 6, which is described in detail in section 2.1. That is, the two phases are repeatedly executed, although in an alternating manner, whereby the second phase S70 follows the first phase S60, then the first phase S60 is executed anew (during a next cycle), and so on. The reason why the optimization procedure is partly interlaced with the execution of the decision trees is that the tree execution only occurs during the first phase of each cycle, while the optimization procedure includes steps that are performed during each of the two phases. However, the part of the optimization procedure that is the most computationally intensive is performed during the second phase.

In detail, the decision trees are executed S62 based on a reference data structure, which aggregates node attributes and thus need to be accessed by the inference algorithm to execute the trees. That is, attributes of the nodes 110 of the decision trees 10 are repeatedly accessed from the reference data structure during the first phase S60 of each cycle.

As noted above, the optimization procedure includes steps that are performed during each of the two phases S60, S70. First step of the optimization procedure is to monitor S68 the accessed attributes. This step is performed during the first phase S60 of each cycle, with a view to updating statistical characteristics of the nodes 110.

This statistical information is subsequently used to build a substitute data structure, which is meant to replace (at least partly) the reference data structure (or certain sections thereof). I.e., the second step of the optimization procedure is to configure S72 this substitute data structure based on the updated statistical characteristics. This second step, however, is performed during the second phase S70 of each cycle, so as not to hinder the inference process.

A third step of the optimization procedure is to update S77 the reference data structure in accordance with the substitute data structure. This update may for instance amount to substituting the whole reference data structure for the substitute data structure. The reference data structure is not necessarily updated at each cycle. Whether to do so may depend on the extent of changes observed since the last update. So, in practice, the reference data structure is updated during at least some of the cycles. In embodiments, the optimization only concerns a subset of the decision tree or subsets of the decision trees involved. In such cases, the reference data structure is updated by substituting one or more subsets of the reference data structure for the substitute data structure, as described later in detail.

This substitution can be made during the second phase S70 of each or some of the cycles, if only to take advantage of lower computational activity during this phase. Interestingly, however, a specific transition mechanism can be used, which allows the update S77 of the reference data structure to be done at any time, i.e., also during the first phase S60 and not necessarily during the second phase S70. The flow shown in FIG. 6 assumes that this update is performed during the second phase, for the sake of illustration.

The proposed method intermittently monitors access characteristics during the first phases of the cycles, i.e., time periods during which the system execute the trees for inference purposes. Besides, the method reconfigures the underlying tree representation during the subsequent time periods. This makes it possible to repeatedly improve the memory representation of the decision trees (i.e., the data structure used to execute the trees at runtime). The optimization is a dynamic process, which can take into account the most recent access characteristics observed, so as to optimize the underlying tree representation against a continually changing context. Notwithstanding, the optimization is performed as an auxiliary process, so as to minimize the impact on the primary process, i.e., the inference process.

In more detail, the first phase of each cycle corresponds to an active phase, during which the trees execute (primary process), typically with high priority, e.g., the highest priority. Conversely, the monitoring process S68 typically executes with lower priority (e.g., as a background process) than the inference process. That is, the monitoring process executes to an extent permitted by the computational resources implementing the inference process during the first phase. Anyhow, the monitoring process can be designed so as to use minimal system resources. In practice, the monitoring process is much less demanding, computationally speaking, than the primary process in practice, so that it can safely execute while running the trees. Note, all processes described herein are fully automated; they do not require any user input, although the extent of the optimization may possibly be parameterized. I.e., a user may possibly set the optimization for it to restrict to one or more hot paths, i.e., the most likely paths of access to the nodes when running the trees.

The proposed approach allows the inference process (the primary process) to be prioritized during the first phase of each cycle, e.g., so as to optimally serve inference requests coming from external clients, which may be processes. In contrast, the reconfiguration of the underlying tree representation is performed in the second phase, before starting a new inference phase. As a result, the online collection of access characteristics has minimal impact on the performance of the ongoing inference operations. Moreover, the substitution mechanism does not result in a large increase of the dynamic memory needs for the inference function.

The second phase corresponds to an idle time period, from the viewpoint of the primary process, i.e., a time period during which no execution of the trees takes place because, e.g., a previous inference job or inference request has been completed. Upon receiving a new inference request, the underlying system may immediately start a new cycle, i.e., interrupt the second phase S70 and start a first phase S60 anew, as in embodiments.

For example, in the flow of FIG. 6, the first phase S60 of each cycle is triggered upon receiving S50 a request to perform inferences, where, e.g., this request is formulated by an external client (which may be a process) communicating with the computerized system on which the method executes. The second phase S70 is subsequently triggered upon completing S64 such inferences. Now, if the system receives S50 a further request to perform further inferences, then it interrupts the second phase and triggers a new cycle, whereby a new first phase S60 is started, and so on. That is, upon receiving a first request from an external client, the method starts to run the decision trees, with a view to serving the client request. On completion of the inferences, an idle phase starts (from the viewpoint of inferences), during which the substitute data structure is built. However, the second phase may end anytime upon receiving a new request. I.e., an idle time period starts when the latest request completes. Receiving a new request terminates the current idle time period, which may cause to postpone the ongoing reconfiguration of the data structure. In other words, client requests act as interrupts, which are preferably handled by software interrupts in the present context.

In variants, each cycle corresponds to one input dataset or a group of input datasets. That is, a single request may include a number of input datasets, which all need be fed to the tree(s). Such datasets are likely to present certain common features, such that a hot path for one input dataset may likely be a hot path for a subsequent input dataset too, hence the benefit of gradually optimizing the reference data structure. Such variants amount to considering each successive input datasets (or group of input datasets) as a single request in the flow of FIG. 5. A timer may be set to control the time duration of the second phase. On expiration of the timer, a new cycle starts to process the next input dataset.

In embodiments, the reference data structure is updated S77 by substituting at least a subset of the reference data structure for the substitute data structure in a memory buffer that is set up in the main memory of the system. As said, the optimization performed may be restricted to the hottest access path(s), e.g., the sequence(s) of nodes having the largest access counts, in the interest of efficiency. In that case, only a subset of the underlying tree representation may need to be updated, whereby the reference data structure is updated S77 by substituting only a subset of the reference data structure for the substitute data structure. Both the subset of the reference data structure that is replaced and the substitute data structure correspond to a same subset of the nodes, i.e., the nodes whose representation in the data structure is being optimized.

The reference data structure is preferably stored S30 in a memory buffer of the computerized system that is specifically set in the main memory of the system to execute inferences. I.e., this buffer corresponds to a region of the main memory of the computerized system. However, repeated accesses to the data contained in this buffer cause the system to cache such data from the main memory. I.e., such data are read from main memory and then stored as cache lines into the cache memory. The cache memory can itself be regarded as a memory buffer. So, in operation, the execution S62 of the decision trees 10 causes to repeatedly call the node attributes from a memory buffer, whose data are cached, such that the node attributes are repeatedly accessed from cache lines of the cache memory. Now, the proposed mechanism makes it possible to take advantage of cache locality. Data that are contiguous in the reconfigured data structure end up being contiguous in the memory buffer and, in turn, in the cache lines too. This allows more efficient inferences to be achieved in practice as fewer and/or more efficient memory accesses are needed to execute the decision tree nodes.

Where the optimization restricts to the hottest access path(s), the reference data structure is updated S77 by substituting only a subset of the reference data structure for the substitute data structure in the memory buffer. The substitute data structure represents only a subset of nodes of the decision trees, such that only a subset of the reference data structure ends up being replaced by the substitute data structure. Still, the residual subset of the reference data structure must be modified to logically link it to the substitute data structure that is inserted in the memory buffer.

This substitution is preferably performed in three steps. First, the substitute data structure is written to the memory buffer, in addition to the initial subset of the reference data structure that is meant to be replaced. I.e., this subset of the reference data structure is not deleted yet. Although the initial subset and the substitute data structure correspond to the same nodes, they form distinct memory representations of such nodes. Not only the node representations may be reordered (to take advantage of data locality) but, in addition, they may also be optimized by compressing nodes into sets of nodes that jointly execute, as discussed in detail in section 2.2.

Second, the substitute data structure is suitably linked into the modified data structure by updating any necessary transition between the residual subset and the substituted structure. Such a transition is typically ensured by a pointer, which enables a transition from the residual subset to the substituted structure and/or a transition from the substitute data structure to the residual subset, if necessary. In the former case, the transition concerns a transition from an upstream node in the residual subset to the most likely child node, i.e., an entry node of the substitute structure. In the latter case, the transition concerns the transition from a leaf node of the substituted structure to a node of the residual subset. Such transitions require keeping track of identifiers of the nodes 110, which identifiers can simply correspond to node offsets.

Third, the initial subset of the reference data structure can be safely deleted from the memory buffer to free up space. From this point on, the corresponding region of the memory buffer is available and can be rewritten to, if necessary. Over time, the corresponding data will be removed from the cache too.

As per the above transition mechanism, the substitute data structure is linked into the residual part of the reference data structure (by overwriting all necessary transitions) only once it has been completely written into the memory buffer. Similarly, the old subset is deleted only once any needed transition has been duly overwritten. Such a mechanism ensures an immediate and smooth transition, which allows the reference data structure to be updated at any time, including during the first phase. Once transitions are overwritten, the execution simply continues based on the updated data structure. This can be for example be advantageous to serve a client request that requires recurrent inferences to be performed by same tree(s) based on multiple input data, as the decision trees can be optimized online. Still, other applications may make it more appropriate to update the reference data structure during the second phase, i.e., when no tree executes, as assumed in the flow of FIG. 6.

The statistical characteristics, which are updated at step S68, preferably include at least a most likely path of access to the nodes, also referred to as a hot path earlier. I.e., the statistical characteristics indicate which paths are the most frequently accessed. In turn, the substitute data structure can be configured S72 by writing attributes of the identified nodes in blocks of the substitute data structure, where such blocks are ordered in accordance with the statistical order obtained from the monitoring step S68 performed during the first phase. Thus, the reference data structure can be updated S77 by merely writing the ordered blocks to contiguous memory blocks of the memory buffer. As a result, attributes of pairs of the nodes 110 that are most likely to be consecutively accessed (as per the statistical characteristics) are written in consecutive memory blocks of the memory buffer. The node attributes are written in the order of statistical occurrences, at consecutive memory locations, which improves locality in the buffer. Writing the node attributes involves store operations at predefined addresses, which can be done fast.

Afterwards, the new data structure can simply be linked into the existing structure, e.g., by adapting the pointer from a node in the residual part (the non-updated part) of the reference data structure to the entry node of the substituted data structure, as explained above. In general, this entry node may correspond to any node, including the root node of a tree where a whole tree structure representation is being replaced. So, the same mechanism can be implemented to replace entire tree representations or only subsets thereof.

Figure 3:
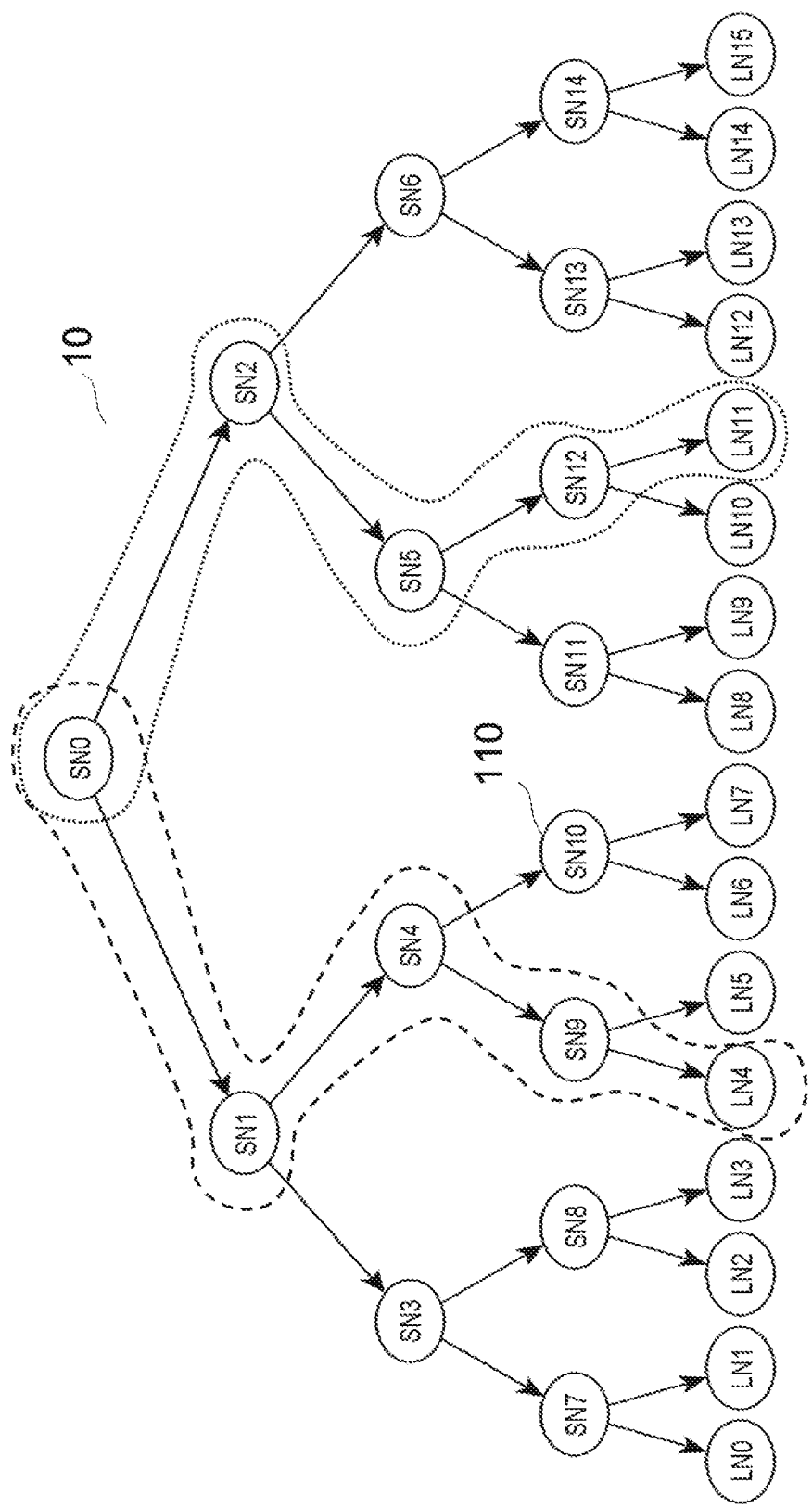
FIG. 3 depicts the decision tree of FIG. 1, onto which two particular access paths are superimposed. The access paths correspond to sequences of nodes having largest access counts during distinct inference cycles. I.e., the two access paths corresponds to most frequent paths observed during the distinct periods. In embodiments, such statistical characteristics are used to reconfigure the data structure representing the decision tree, thanks to an optimization procedure.
Figure 5:
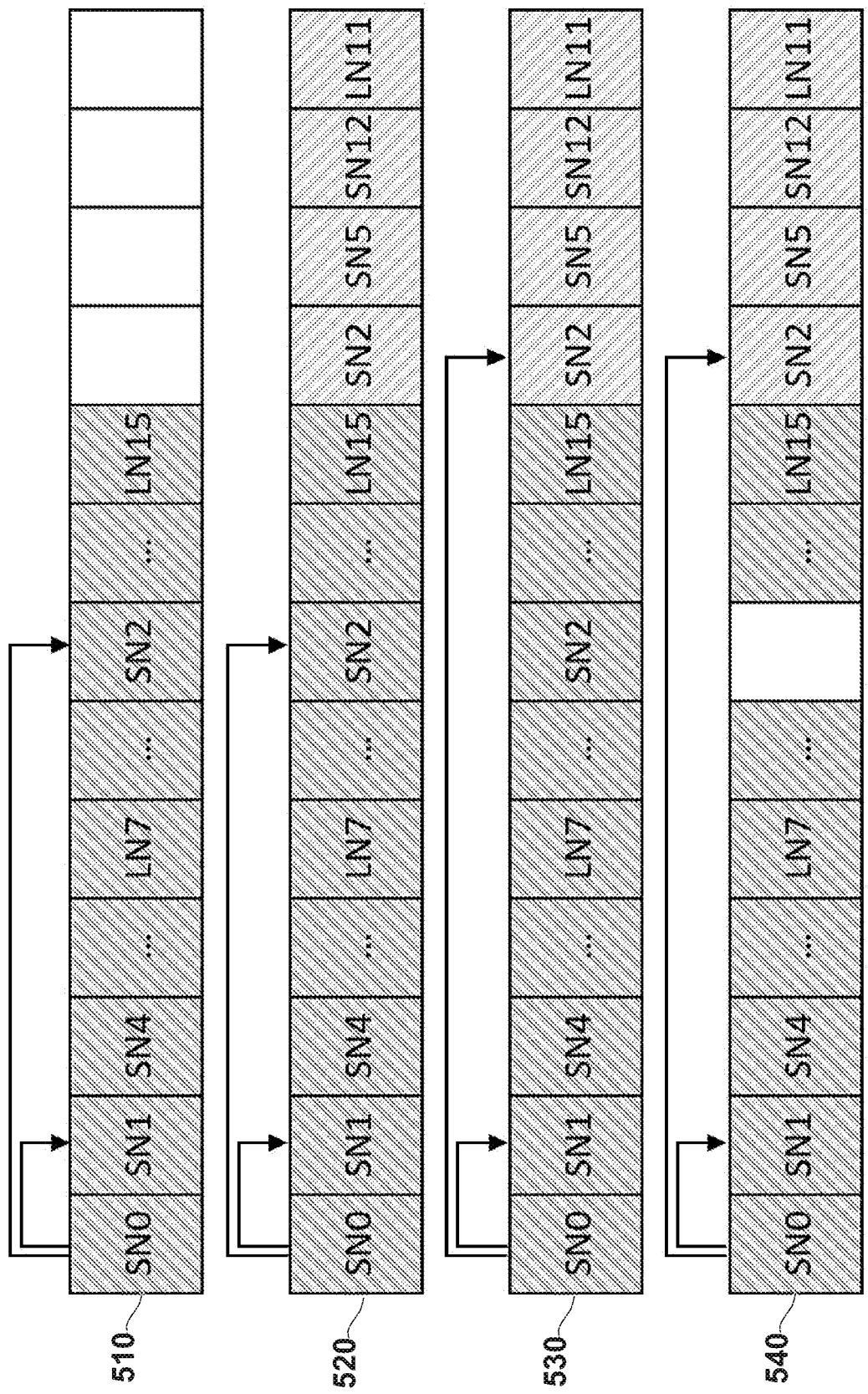
FIG. 5 schematically illustrates, step-by-step, how the reference data structure is updated in embodiments.

The above mechanism is illustrated in FIGS. 3-5. FIG. 3 depicts the same tree as in FIG. 1. Assume that the first five memory blocks of the memory buffer initially correspond to the node sequence SN0—SN1—SN4—SN9—LN4 surrounded by a dashed contour line in FIG. 3. An initial arrangement of the memory blocks 400 is illustrated in FIG. 4. This buffer is used for inferences performed during the first phase of an initial cycle. However, observations made during the first phase of this cycle allows a new hot path to be identified, which is the path surrounded by a dotted contour line in FIG. 3, i.e., corresponding to the sequence SN0—SN2—SN5—SN12—LN11. Initially, the corresponding nodes are not necessarily stored in contiguous blocks. I.e., the block corresponding to SN2 is not necessarily followed by the block corresponding to SN5 in 400. During the second phase of this cycle, a substitute structure is built, wherein attributes of nodes SN2, SN5, SN12, LN11 are written in contiguous blocks 410, see FIG. 4. Next, the block SN0 is logically linked to the new block corresponding to SN2, by overwriting the initial pointer in the block corresponding to SN0; the initial pointer was previously pointing at the original location of SN2.

The full update operation is illustrated in FIG. 5. Initially, a memory blocks of the buffer 510 reflects the node sequence SN0—SN1—SN4—SN9—LN4, see FIG. 5. The pointer (materialized by an arrow on top of the blocks) from SN0 to SN1, which is a child node of SN0, may in fact be implicit in that case. I.e., by default, the algorithm may look up the next memory block, e.g., should the test performed as part of the node processing be satisfied. In addition, there is a second pointer (materialized by a second arrow) from SN0 to SN2, which is the second child node of SN0. Next, attributes of the node sequence 520, SN2—SN5—SN12—LN11 are written to contiguous blocks, in the first blocks available in the buffer. A transition from block SN0 to block SN2 is subsequently updated, as materialized by the wider arrow in 530 replacing the arrow from SN0 to the original SN2 location in 510 and 520. From this point on, the inferences are performed based on the buffer as shown in 530, where the initial blocks corresponding to nodes SN2, SN5, SN12, and LN11, are now disregarded since they are no longer logically linked. Finally, the blocks corresponding to nodes SN2, SN5, SN12, and LN11, can be deleted from the buffer or marked as available, see 540, such that data can later be written to such blocks if needed. Note, the present methods may further involve some defragmentation mechanism, which will clean up the buffer, from time to time, by rewriting it to compress the sole active blocks.

A fortunate consequence of the above mechanism is that consecutive blocks in the memory buffer will give rise to consecutive data in the cache lines too, as evoked earlier. I.e., writing S77 suitably ordered blocks onto the memory buffer causes to orderly map the blocks onto memory blocks of cache lines of the cache memory (which itself is a memory buffer), at least to some extent, which depends on the commensurability between sequences of blocks in the initial memory buffer (as set up in the main memory) and the length of the cache lines. Now, the blocks can be dimensioned with a view to enhancing the mapping of consecutive blocks to memory cache lines. In all cases, the rearrangement of the blocks in the buffer improves performance during the subsequent inferences because cache locality is exploited.

The following discussion is directed to the statistical information that can be used to reconfigure the data structure representing the nodes. The statistical characteristics of the nodes are updated based on the access characteristics monitored at step S68. As said, the statistical characteristics may allow to identify at least a most likely path (or hot path) of access to the nodes, e.g., the path that is the most frequently accessed during the last inference job(s). Several hot paths may possibly be identified from the statistical characteristics. The actual time window used to obtain such statistical characteristics can be adjusted in accordance with the target application. For example, the time window may be restricted to the current inference job only.

The updated statistical characteristics preferably include access counts of the nodes 110. The most likely access path(s) can easily be determined based on such access counts. Based on the determined hot path(s), a new substitute data structure can be configured, which optimally aggregates characteristics of the nodes of such paths in consecutive memory blocks of the buffer. Thus, instead of attempting to optimize the representation of entire trees in the memory buffer, the algorithm may focus on the hottest path(s) only, in which case the substitute data structure represents only a subset of the nodes 110 of the trees, as in embodiments discussed above. In that case, the reference data structure is updated by writing memory blocks associated with this subset of nodes to memory blocks of the memory buffer. The residual part of the data structure captures the remaining node attributes, the processing of which remains unchanged, except for the transitions, as explained earlier.

To summarize, the optimization may focus on selected nodes only, i.e., the nodes of the hottest path(s). Where several paths are considered, the optimization concern several subsets of nodes, corresponding to subtrees. The subsets of nodes represented by the substitute data structure are nodes having larger access counts than remaining nodes of the trees, as per the updated statistical characteristics of the nodes.

The following discusses criteria that can be used to decide whether to update S77 the reference data structure or not. As seen in FIG. 6, the optimization procedure may compare S74 the substitute data structure with the initial data structure to determine the extent of changes from the initial data structure (i.e., the reference data structure that is currently used), using any suitable metric. Next, based on the extent of changes determined, the procedure decides S76 whether to update S77 the reference data structure. Both the comparison S74 and the update S77 may adequately be performed during the second phase, i.e., right after configuring the substitute data structure. However, this may also be performed at any time, notably thanks to the seamless transition mechanism described earlier.

The extent of changes may for instance be determined as a distance between the substitute data structure and its corresponding subset of the initial data structure, although a similarity measure may equivalently be used instead of a distance. The metric may for instance quantify the difference between the current and previous hot paths. For example, a distance can be determined according to access counts of the nodes. The distance metric may notably be based on the relative or absolute number of nodes that are part of both the current and previous hot paths. In variants, the metric may be based on the number of nodes for which the child node that is most likely to be accessed (based on the latest access counts) has changed, or the difference in access counts probabilities between the two child nodes in case of a change. The comparison can be implemented based on a recursive processing of the new and original access paths, starting at the root nodes of the corresponding tree structures. Note, the comparison can possibly be tested independently from the construction of the new structure; in parallel in the flow.

Another possibility is to extract features (in a machine learning sense) from the substitute data structure and the corresponding portions in the current data structure. Then, distances can be computed between the extracted vectors.

In all cases, a threshold can be used to determine whether the reference data structure must be updated, as assumed in FIG. 6, step S76. The threshold value can be refined through trial and error.

Although the accompanying drawings assume a single tree (for simplicity), it should be kept in mind that the present methods can be applied to several decision trees. I.e., several trees may be concurrently executed for inference purposes, as in ensemble methods evoked earlier. Where the decision trees form part of an ensemble model, the inference result eventually returned S66 by the algorithm is based on an outcome of executing each of the decision trees. Even if several trees are involved, each decision tree is processed individually, starting from its respective root node. Still, some of the trees may possibly be processed in parallel, e.g., taking advantage of vector processing.

The trees involved have respective representations, which can be captured in a same memory buffer. In that case, distinct trees corresponds to distinct portions of the buffer. In variants, the trees may be represented by data structures captured in distinct memory buffers. However, this does not substantially change the problem at hand. The superset of the distinct buffer still form a memory buffer, subsets of which can be optimized, dynamically, according to the present methods. In that case, the optimization procedure requires monitoring characteristics of accesses to at least subsets of the nodes of the several decision trees involved, in order to reconfigure the corresponding representations.

Another aspect of the invention is now described, which concerns a computerized system 101 for dynamically optimizing decision tree inference operations. Basically, the system 101 includes processing means 105 that are configured to repeatedly execute one or more decision trees 10 for inference purposes and repeatedly perform an optimization procedure according to two-phase cycles, as described earlier in reference to the present methods. That is, the system is typically equipped with storage means 120, which store computerized methods in the form of software, the instructions of which can be loaded into the main memory of the system 101 to perform steps according to the present methods.

In operation, each cycle includes two alternating phases, the latter including a first phase and a second phase. Consistently with the present methods, the decision trees are executed based on a reference data structure, whereby attributes of nodes 110 of the decision trees 10 are repeatedly accessed from the reference data structure during the first phase of each cycle. Meanwhile, the optimization procedure causes to monitor the accessed attributes to update statistical characteristics of the nodes 110, during the first phase of each cycle. In addition, this procedure configures a substitute data structure (based on the updated statistical characteristics) during the second phase of each cycle. Finally, the processing means 105 may instruct to update the reference data structure in accordance with the substitute data structure, at any suitable time.

The system may comprise one or more computerized units such as shown in FIG. 7. For example, several units 101 may be configured to perform tree-based inferences and optimize the data structures used to execute the trees. In variants, the system includes a single 101. Such a computerized unit 101 is discussed in detail in section 3.

A final aspect of the invention concerns a computer program product for dynamically optimizing decision tree inference operations. This computer program product comprises a computer readable storage medium having program instructions embodied therewith, wherein the program instructions are executable by processing means 105, e.g., of one or more computerized units 101 such as shown in FIG. 7, to cause such processing means to perform steps as described herein in reference to the present methods. Such instructions will cause the processing means 105 to repeatedly execute one or more decision trees for inference purposes and repeatedly perform an optimization procedure, as described above. In particular, the processing means 105 may cause to update a reference data structure by substituting at least a subset thereof for a substitute data structure, as configured thanks to the optimization procedure. Further characteristics of such a computer program product are discussed in section 3.

The above embodiments have been succinctly described in reference to the accompanying drawings and may accommodate a number of variants. Several combinations of the above features may be contemplated. Examples are given in the next section.

A preferred flow of operations is now discussed in reference to FIG. 6. To start with, one or more decision trees are provided at step S10, which may for example form an ensemble model. An initial reference data structure is then determined at step S20. The reference data structure is a representation of the decision trees. A memory buffer is configured at step S30, in accordance with the reference data structure. I.e., memory blocks of the buffer are populated with attributes of the nodes.

A first cycle of computations starts when receiving (step S50) an inference request, e.g., from an external client who wishes to perform inferences with the trees. The request may contain the input dataset, based on which inferences are to be performed. The algorithm starts a first phase S60, during which the inferences are performed by accessing data of the reference data structure previously configured. Given the recurrent operations involved, the system comes to cache the data of the reference data structure in cache lines of a cache memory.

In detail, the decision trees execute S62 during the first phase, which causes to repeatedly access node attributes from the memory buffer (or, in fact, from the cache). When the execution completes (step S64), an inference outcome is obtained (step S66), e.g., as an ensemble result. In parallel to the tree execution S62, the system monitors S68 node access characteristics to update statistical characteristics (e.g., access counts) of the nodes, based on which hot paths can be identified.

The second phase S70 starts when the first phase completes, i.e., upon obtaining an inference result. During the second phase, the algorithm configures S72 the substitute data structure based on the previously monitored characteristics, i.e., based on the updated statistical characteristics. At step S74, a distance is measured between the substitute data structure and (one or more subsets of) the reference data structure. If this distance happens to be larger than a given threshold (S76: Yes), the algorithm updates S77 the reference data structure based on the substitute data structure, as explained in section 1. Else (S76: No), the algorithm pauses S78. A substitution will perhaps intervene later, during another cycle. Note, in variants to the embodiment of FIG. 6, steps S74-S77 may possibly be performed at any time, as explained in section 1.

When receiving a further client request, the algorithm interrupts the second phase S70 to start another cycle, i.e., a new first phase S60, to perform further inferences.

Various techniques can be used to accelerate inferences. To start with, at least some of the nodes of the trees may be grouped into one or more supersets of nodes designed for joint execution. Again, the supersets can be determined based on access counts, hot paths, etc. Nodes of each superset are jointly executed by loading attributes of each superset node in a respective cache line of the cache memory (unless this cache line is already loaded in the cache memory). Such attributes are then processed from the respective cache line loaded.

In addition, vector processing can be exploited to parallelize the computations. This, in particular, makes it possible to parallelize and accelerate the processing of the trees, e.g., using single instruction, multiple data instructions (SIMD) instructions. This assumes that the underlying computerized system includes one or more vector processing (e.g., SIMD) units as part of its central processing unit (CPU). These units implement instructions that are designed, during the programming phase, to operate more efficiently and effectively on one-dimensional arrays of data (i.e., the "vectors"), in contrast to scalar instructions. The vectorization scheme can notably involve a same input record processed across several decision trees and/or different input records across a same tree (or a few trees).

In particular, the nodes of each superset can be jointly executed by vector processing. That is, vector operations are speculatively performed on vector operands mapped onto the attributes of the nodes of each superset, as loaded in the respective cache line.

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used, which machines may advantageously enable vector processing.

For instance, FIG. 7 schematically represents a computerized unit 101 (e.g., a general or specific-purpose computer), which may possibly interact with other, similar units, so as to be able to perform steps according to the present methods.

In exemplary embodiments, in terms of hardware architecture, as shown in FIG. 7, each unit 101 includes at least one processor 105, and a memory 110 coupled to a memory controller 115. Several processors (CPUs, and/or GPUs) may possibly be involved in each unit 101. To that aim, each CPU/GPU may be assigned a respective memory controller, as known per se. One or more of the processors may include a vector processing or SIMD unit, which preferably allows multithreading. More preferably, the CPU/GPU include several vector processing or SIMD units.

One or more input and/or output (I/O) devices 145, 150, 155 (or peripherals) are communicatively coupled via a local input/output controller 135. The input/output controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software instructions. The processors 105 can be any custom made or commercially available processor(s). In general, they may involve any type of semiconductor-based microprocessor (in the form of a microchip or chip set), or generally any device for executing software instructions, as long as such devices allow vector processing.

The memory 110 typically includes volatile memory elements (e.g., random-access memory), and may further include nonvolatile memory elements. Moreover, the memory 110 may incorporate electronic, magnetic, optical, and/or other types of storage media.

Software in memory 110 may include one or more separate programs, each of which comprises executable instructions for implementing logical functions. In the example of FIG. 7, instructions loaded in the memory 110 may include instructions arising from the execution of the computerized methods described herein in accordance with exemplary embodiments. The memory 110 may further load a suitable operating system (OS) 111. The OS 111 essentially controls the execution of other computer programs or instructions and provides scheduling, input-output control, file and data management, memory management, and communication control and related services.

Possibly, a conventional keyboard and mouse can be coupled to the input/output controller 135. Other I/O devices 140-155 may be included. The computerized unit 101 can further include a display controller 125 coupled to a display 130. Any computerized unit 101 will typically include a network interface or transceiver 160 for coupling to a network, to enable, in turn, data communication to/from other, external components, e.g., other units 101.

The network transmits and receives data between a given unit 101 and other similar devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

The present invention may thus be a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method of dynamically optimizing decision tree inference operations performed by a computerized system, the method comprising, at the computerized system,
repeatedly executing one or more decision trees for inference purposes and repeatedly performing an optimization procedure according to two-phase cycles, wherein each of the cycles includes two alternating phases, the two alternating phases including a first phase and a second phase,
the one or more decision trees are executed based on a reference data structure, whereby attributes of nodes of the one or more decision trees are repeatedly accessed from the reference data structure during the first phase of each of the cycles, and
performing the optimization procedure comprises:
during the first phase of each of the cycles, monitoring the accessed attributes to update statistical characteristics of the nodes;
during the second phase of each of the cycles, configuring a substitute data structure based on the updated statistical characteristics; and
updating the reference data structure in accordance with the substitute data structure.

2. The method according to claim 1, wherein,
the first phase of each of the cycles is triggered upon receiving a request to perform inferences,
the second phase of each of the cycles is subsequently triggered upon completing said inferences, and
the first phase of a next one of the cycles is triggered upon receiving a further request to perform further inferences.

3. The method according to claim 1, wherein,
the reference data structure is updated during the second phase of at least some of the cycles.

4. The method according to claim 1, wherein,
the reference data structure is updated by substituting at least a subset of the reference data structure for the substitute data structure.

5. The method according to claim 4, wherein,
the reference data structure is stored in a memory buffer of the computerized system, whereby the attributes are repeatedly accessed from this memory buffer upon executing the one or more decision trees, and
the reference data structure is updated by substituting at least said subset of the reference data structure for the substitute data structure in the memory buffer.

6. The method according to claim 5, wherein,
the substitute data structure represents only a subset of the one or more decision trees, whereby only said subset of the reference data structure is substituted for the substitute data structure in the memory buffer, while a residual subset of the reference data structure is modified to logically link it to the substitute data structure.

7. The method according to claim 5, wherein,
the updated statistical characteristics includes at least a most likely path of access to the nodes,
configuring the substitute data structure comprises writing attributes of the identified nodes in blocks of the substitute data structure, wherein the blocks are ordered in accordance with said statistical order, and
the reference data structure is updated by writing the ordered blocks to memory blocks of the memory buffer, whereby attributes of at least some pairs of the nodes that are consecutively accessed as per said statistical order are written in consecutive memory blocks of the memory buffer.

8. The method according to claim 7, wherein,
said memory buffer is a cache memory of the computerized system, whereby writing the ordered blocks causes to orderly map the ordered blocks onto memory blocks of cache lines of the cache memory.

9. The method according to claim 7, wherein,
at monitoring, the updated statistical characteristics of the nodes include access counts of the nodes and said statistical order is determined based on the access counts.

10. The method according to claim 7, wherein,
the substitute data structure represents only a subset of the nodes of the one or more decision trees.

11. The method according to claim 10, wherein,
the subsets of the nodes represented by the substitute data structure are nodes having larger access counts than remaining nodes of the one or more decision trees, as per the updated statistical characteristics.

12. The method according to claim 1, wherein,
the accessed attributes are monitored according to a process having a lower priority than an execution of instructions for executing the one or more decision trees.

13. The method according to claim 1, wherein performing the optimization procedure further comprises
comparing the substitute data structure with the reference data structure to determine an extent of changes from the reference data structure, and
based on the determined extent of changes, deciding whether to update the reference data structure in accordance with the substitute data structure.

14. The method according to claim 13, wherein,
said extent of changes is determined as a distance between the substitute data structure and a corresponding subset of the reference data structure.

15. The method according to claim 14, wherein,
said distance is determined according to access counts of the nodes, the access count forming part of the monitored attributes.

16. The method according to claim 1, wherein,
the method is performed in respect of a set of decision trees, whereby several decision trees are being concurrently executed for inference purposes.

17. The method according to claim 16, wherein,
the decision trees of the set form part of an ensemble model, whereby an inference result as eventually returned by the method is based on an outcome of executing each of the decision trees of the set.

18. A computerized system for dynamically optimizing decision tree inference operations, wherein the computerized system comprises:
processing means that are configured to repeatedly execute one or more decision trees for inference purposes and repeatedly perform an optimization procedure according to two-phase cycles, wherein, in operation,
each of the cycles includes two alternating phases, the two alternating phases including a first phase and a second phase,
the one or more decision trees are executed based on a reference data structure, whereby attributes of nodes of the one or more decision trees are repeatedly accessed from the reference data structure during the first phase of each of the cycles, and
performing the optimization procedure comprises:
during the first phase of each of the cycles, monitoring the accessed attributes to update statistical characteristics of the nodes;
during the second phase of each of the cycles, configuring a substitute data structure based on the updated statistical characteristics; and
updating the reference data structure in accordance with the substitute data structure.

19. A computer program product for dynamically optimizing decision tree inference operations, the computer program product comprising a computer readable storage medium having program instructions embodied therewith, the program instructions executable by processing means to cause the latter to:
repeatedly execute one or more decision trees for inference purposes and repeatedly perform an optimization procedure according to two-phase cycles, wherein,
each of the cycles includes two alternating phases, the two alternating phases including a first phase and a second phase,
the one or more decision trees are executed based on a reference data structure, whereby attributes of nodes of the one or more decision trees are repeatedly accessed from the reference data structure during the first phase of each of the cycles, and
performing the optimization procedure comprises:
during the first phase of each of the cycles, monitoring the accessed attributes to update statistical characteristics of the nodes;
during the second phase of each of the cycles, configuring a substitute data structure based on the updated statistical characteristics; and
updating the reference data structure in accordance with the substitute data structure.

20. The computer program product according to claim 19, wherein,
the program instructions are executable by the processing means to further cause the latter to update the reference data structure by substituting at least a subset of the reference data structure for the substitute data structure.

21. The computer program product according to claim 20, wherein,
the program instructions are executable by the processing means to further cause the latter to store the reference data structure in a memory buffer of the computerized system, whereby the attributes are repeatedly accessed from this memory buffer upon executing the one or more decision trees, and
the reference data structure is updated by substituting at least said subset of the reference data structure for the substitute data structure in the memory buffer.

22. The computer program product according to claim 20, wherein,
the substitute data structure represents only a subset of the one or more decision trees, whereby only said subset of the reference data structure is substituted for the substitute data structure in the memory buffer, while a residual subset of the reference data structure is modified to logically link it to the substitute data structure.

23. The computer program product according to claim 20, wherein,
the program instructions are executable by the processing means to further cause the latter to update the reference data structure by substituting at least a subset of the reference data structure for the substitute data structure.

24. The computer program product according to claim 20, wherein,
the updated statistical characteristics includes at least a most likely path of access to the nodes,
configuring the substitute data structure comprises writing attributes of the identified nodes in blocks of the substitute data structure, wherein the blocks are ordered in accordance with said statistical order, and
the reference data structure is updated by writing the ordered blocks to memory blocks of the memory buffer, whereby attributes of at least some pairs of the nodes that are consecutively accessed as per said statistical order are written in consecutive memory blocks of the memory buffer.

25. The computer program product according to claim 19, wherein, the accessed attributes are monitored according to a process having a lower priority than an execution of instructions for executing the one or more decision trees.

* * * * *